(12) United States Patent
Suguro et al.

(10) Patent No.: US 7,995,178 B2
(45) Date of Patent: Aug. 9, 2011

(54) LIQUID-CRYSTAL-DISPLAY PANEL AND BARCODE READING SYSTEM USING THE SAME

(75) Inventors: Akira Suguro, Fujimi (JP); Shinya Kondoh, Nishitokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 1247 days.

(21) Appl. No.: 10/547,734

(22) PCT Filed: Dec. 1, 2004

(86) PCT No.: PCT/JP2004/017879
§ 371 (c)(1),
(2), (4) Date: Sep. 2, 2005

(87) PCT Pub. No.: WO2005/062109
PCT Pub. Date: Jul. 7, 2005

(65) Prior Publication Data
US 2007/0024936 A1 Feb. 1, 2007

(30) Foreign Application Priority Data
Dec. 24, 2003 (JP) .................................. 2003-427849

(51) Int. Cl.
*G02F 1/141* (2006.01)
*G02F 1/1335* (2006.01)
(52) U.S. Cl. .................... 349/133; 349/134; 349/100
(58) Field of Classification Search .......... 349/133–134, 349/100
See application file for complete search history.

(56) References Cited

U.S. PATENT DOCUMENTS

| | | | |
|---|---|---|---|
| 6,115,091 A * | 9/2000 | Kondoh et al. | 349/72 |
| 6,742,762 B2 * | 6/2004 | Koyama | 251/59 |
| 2002/0071076 A1 * | 6/2002 | Webb et al. | 349/117 |
| 2003/0173408 A1 * | 9/2003 | Mosher et al. | 235/492 |

FOREIGN PATENT DOCUMENTS

| | | |
|---|---|---|
| JP | 2-56520 A | 2/1990 |
| JP | 7-152848 A | 6/1995 |
| JP | 9-90347 A | 4/1997 |
| JP | 2003-222893 A | 8/2003 |
| JP | 2004-104688 A | 4/2004 |

OTHER PUBLICATIONS

First Notice Informing the Applicant of the Communication of the International Applicantion (to Designated Offices Which Do Not Apply The 30 Month Time Limit Under Article 22(1)).

(Continued)

*Primary Examiner* — Wen-Ying P Chen
(74) *Attorney, Agent, or Firm* — Sughrue Mion, PLLC

(57) ABSTRACT

In a liquid-crystal-display panel (1) for displaying a barcode that is formed with bars having various widths arranged in parallel at various intervals by an electro-optic effect of liquid crystal, a direction of a transmissive axis (P1) of a polarizing film disposed on a side on which light from a barcode reader is irradiated is set to coincides with a direction in which the light is polarized. Moreover, the direction of transmissive axis (P1) of the polarizing film is set to be parallel or substantially parallel to a short side or a long side of each of the bars forming the barcode. A direction (M) of a long axis of a liquid crystal molecule (LCM) in a first ferroelectric state or in a second ferroelectric state is set to be parallel or substantially parallel to the direction of transmissive axis (P1) of the polarizing film, or set to form an angel of 45 degrees or substantially 45 degrees therebetween.

6 Claims, 14 Drawing Sheets

OTHER PUBLICATIONS

Second and Supplementary Notice Informing the Applicant of the Communication of the International Application (To Designated Offices Which Apply the 30 Month Time Limit Under Article 22(I)).

International Preliminary Report on Patentability.

* cited by examiner

LIQUID-CRYSTAL-DISPLAY PANEL AND BARCODE READING SYSTEM USING THE SAME

TECHNICAL FIELD

The present invention relates to a liquid-crystal-display panel, and more particularly to a liquid-crystal-display panel that displays a barcode so as to be readable by irradiation with light polarized in a predetermined direction, and a barcode reading system using the same.

BACKGROUND ART

Conventionally, in retail stores such as a super market, a barcode is indicated together with an article name and a value on a shelf label attached to a shelf on which the article is placed, and a system for managing articles for sale by a point of sale (POS) (article value management system) using the barcode is applied. The shelf label used in such system is called an electronic shelf label. An ordinary electronic shelf label is designed such that a sheet on which a barcode is printed is put while displaying an article name and a value on a liquid-crystal-display panel. Besides, an electronic shelf label that is designed such that not only an article name and a value but also a barcode is displayed on a liquid-crystal-display panel is proposed (for example, patent literature 1). The electronic shelf label disclosed in patent literature 1 uses chiral nematic liquid-crystal (cholesteric liquid crystal) having a memorizable operation mode.

Patent literature 1: Japanese Patent Application Laid-Open Publication No. 2003-222893

DISCLOSURE OF INVENTION

Problem to be Solved by the Invention

However, when the inventors of the present invention manufactured a liquid-crystal-display panel using ferroelectric liquid crystal having the memorizable operation mode, and tested reading of barcodes displayed on the liquid-crystal-display panel with a barcode reader in which a low-output laser beam is used as a light source, it was found that reading failure occurs.

To solve the above problem, it is an object of the present invention to provide a liquid-crystal-display panel capable of displaying a barcode stably and accurately read by a barcode reader of the type that irradiates with light polarized in a predetermined direction. It is also an object of the present invention to provide a barcode reading system in which a barcode is displayed on a liquid-crystal-display panel so that the barcode is stably and accurately read with a barcode reader that irradiates light polarized in a predetermined direction.

Means for Solving Problem

To solve the above problem and to achieve the object, a liquid-crystal-display panel according to the present invention is a liquid-crystal-display panel for displaying a barcode that is formed with bars having various widths arranged in parallel at various intervals by an electro-optic effect of liquid crystal. The liquid-crystal-display panel includes a pair of substrates opposing to each other; a liquid crystal layer sealed between the substrates; and a polarizing film attached on one of the substrates, the one on a side on which light for reading the barcode is irradiated. A direction of a transmissive axis of the polarizing film coincides with a direction in which the light for reading a barcode is polarized.

According to the present invention, the light emitted from a barcode reader transmits through the polarizing film and enters the liquid crystal layer, thereby enabling to read the barcode stably and accurately.

In the liquid-crystal-display panel according to the above invention, the direction of the transmissive axis of the polarizing film is parallel or substantially parallel to a short side of each of the bars forming the barcode.

According to the present invention, when a barcode reader that reads a barcode by irradiating light polarized in a direction parallel or substantially parallel to a short side of the barcode, the light emitted from the barcode reader transmits through the polarizing film and enters the liquid crystal layer, thereby enabling to read the barcode stably and accurately.

In the liquid-crystal-display panel according to the above invention, the direction of the transmissive axis of the polarizing film is parallel or substantially parallel to a long side of each of the bars forming the barcode.

According to the present invention, when a barcode reader that reads a barcode by irradiating light polarized in a direction parallel or substantially parallel to a long side of the barcode, the light emitted from the barcode reader transmits through the polarizing film and enters the liquid crystal layer, thereby enabling to read the barcode stably and accurately.

In the liquid-crystal-display panel according to the above invention, the liquid crystal layer is formed with ferroelectric liquid crystal having a first ferroelectric state and a second ferroelectric state as stable states, and a direction of a long axis of a molecule of ferroelectric liquid crystal in any one of the first ferroelectric state and the second ferroelectric state is parallel or substantially parallel to the direction of the transmissive axis of the polarizing film.

According to the present invention, since ferroelectric liquid crystal has a memorizable property, a display of the barcode is maintained even if a voltage applied is removed after making a desirable barcode to be displayed by applying the voltage to liquid crystal layer. In other words, it is possible to keep displaying the barcode without continuously applying a voltage to the liquid crystal. Therefore, it is possible to obtain low power consumption. Moreover, since the bars of the barcode (portions displayed in black) are displayed in clearer black, it is possible to display the barcode in higher contrast ratio. Therefore, when a barcode reader that exhibits higher recognition rate as the contrast of a barcode increases is used, it is possible to read a barcode more stably and accurately.

In the liquid-crystal-display panel according to the above invention, the liquid crystal layer is formed with ferroelectric liquid crystal having a first ferroelectric state and a second ferroelectric state as stable states, and an angle between a direction of a long axis of a molecule of ferroelectric liquid crystal in any one of the first ferroelectric state and the second ferroelectric and the direction of the transmissive axis of the polarizing film is 45 degrees or substantially 45 degrees.

According to the present invention, since ferroelectric liquid crystal has a memorizable property, a display of the barcode is maintained even if a voltage applied is removed after making a desirable barcode to be displayed by applying the voltage to liquid crystal layer. In other words, it is possible to keep displaying the barcode without continuously applying a voltage to the liquid crystal. Therefore, it is possible to obtain low power consumption. Moreover, since spaces between the bars (portions displayed in white) are displayed in clearer white, it is possible to read a barcode more stably and accurately when a barcode reader that exhibits higher recognition rate as the light intensity increases.

The liquid-crystal-display panel according to the above invention further includes a data converting unit that converts original data for displaying a barcode on a display unit into data for displaying the barcode rotated by 90 degrees. The barcode that is rotated by 90 degrees is displayed on the display unit based on new data obtained by conversion by the data converting unit.

According to the present invention, when the barcode cannot be read as it is because a polarizing direction of the light emitted from the barcode reader and the transmissive axis of the polarizing film cross at right angles, the barcode is displayed such that the barcode is rotated by 90 degrees on a display unit. By accordingly bringing the barcode reader into a state rotated by 90 degrees relative to the display unit, it is possible to make the polarizing direction of the light for reading the barcode coincide with the transmissive axis of the polarizing film. Therefore, the light for reading a barcode transmits through the polarizing film and enters the liquid crystal layer, thereby enabling to read the barcode stably and accurately.

A barcode reading system according to the present invention includes a liquid-crystal-display panel for displaying a barcode that is formed with bars having various widths arranged in parallel at various intervals by an electro-optic effect of liquid crystal; and a barcode reader that emits light for reading the barcode to the liquid-crystal-display panel. The liquid-crystal-display panel includes a pair of substrates opposing to each other; a liquid crystal layer sealed between the substrates; and a polarizing film attached on one of the substrates, the one on a side on which light for reading the barcode is irradiated. A direction in which the light is polarized, the light irradiated to the liquid-crystal-display panel by the barcode reader, coincides with a direction of a transmissive axis of the polarizing film.

According to the present invention, the light emitted from the barcode reader transmits through the polarizing film and enters the liquid crystal layer, thereby enabling to read the barcode stably and accurately.

Effect of the Invention

According to a liquid-crystal-display panel according to the present invention, it is possible to display a barcode that can be read stably and accurately by a barcode reader that reads a barcode by irradiating light polarized in a predetermined direction. Furthermore, according to a barcode reading system according to the present invention, it is possible to read a barcode displayed on the liquid-crystal-display panel stably and accurately with the barcode reader that reads a barcode by irradiating light polarized in a predetermined direction.

EXPLANATIONS OF LETTERS OR NUMERALS

Figure 1:
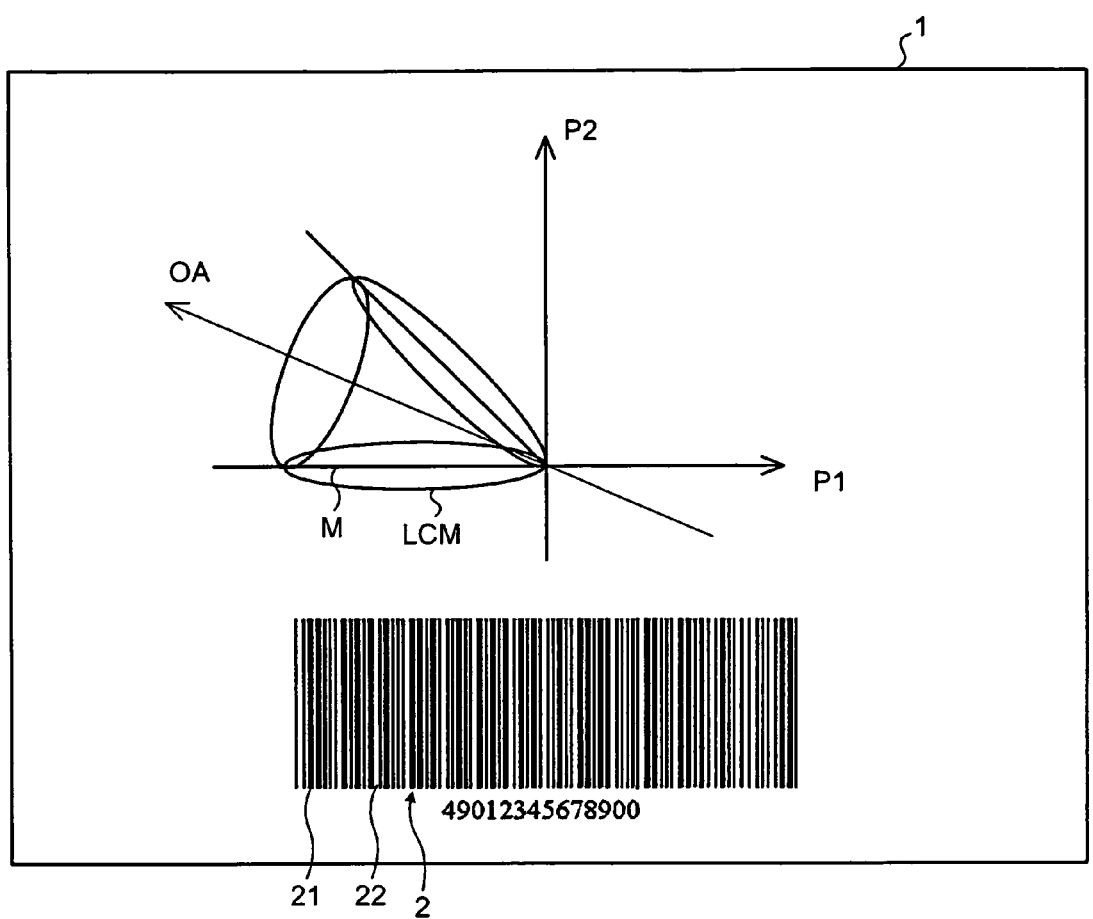
FIG. 1 is a schematic for explaining relationship between a direction of a molecular long axis of ferroelectric liquid crystal, a transmissive axis of a polarizing film, and orientation of a barcode on a liquid-crystal-display panel according to a first embodiment of the present invention.

LCM Liquid crystal molecule
M Long axis direction of a molecule
P1 Transmissive axis of a first polarizing film
1 Liquid-crystal-display panel
2 Barcode
11a First polarizing film
12 Liquid crystal layer
13a, 13b Glass substrate
21 Bar
31 Display unit
35 Data converting unit

BEST MODE(S) FOR CARRYING OUT THE INVENTION

Exemplary embodiments of a liquid-crystal-display panel according to the present invention will be explained in detail with reference to the accompanying drawings.

First Embodiment

Figure 2:
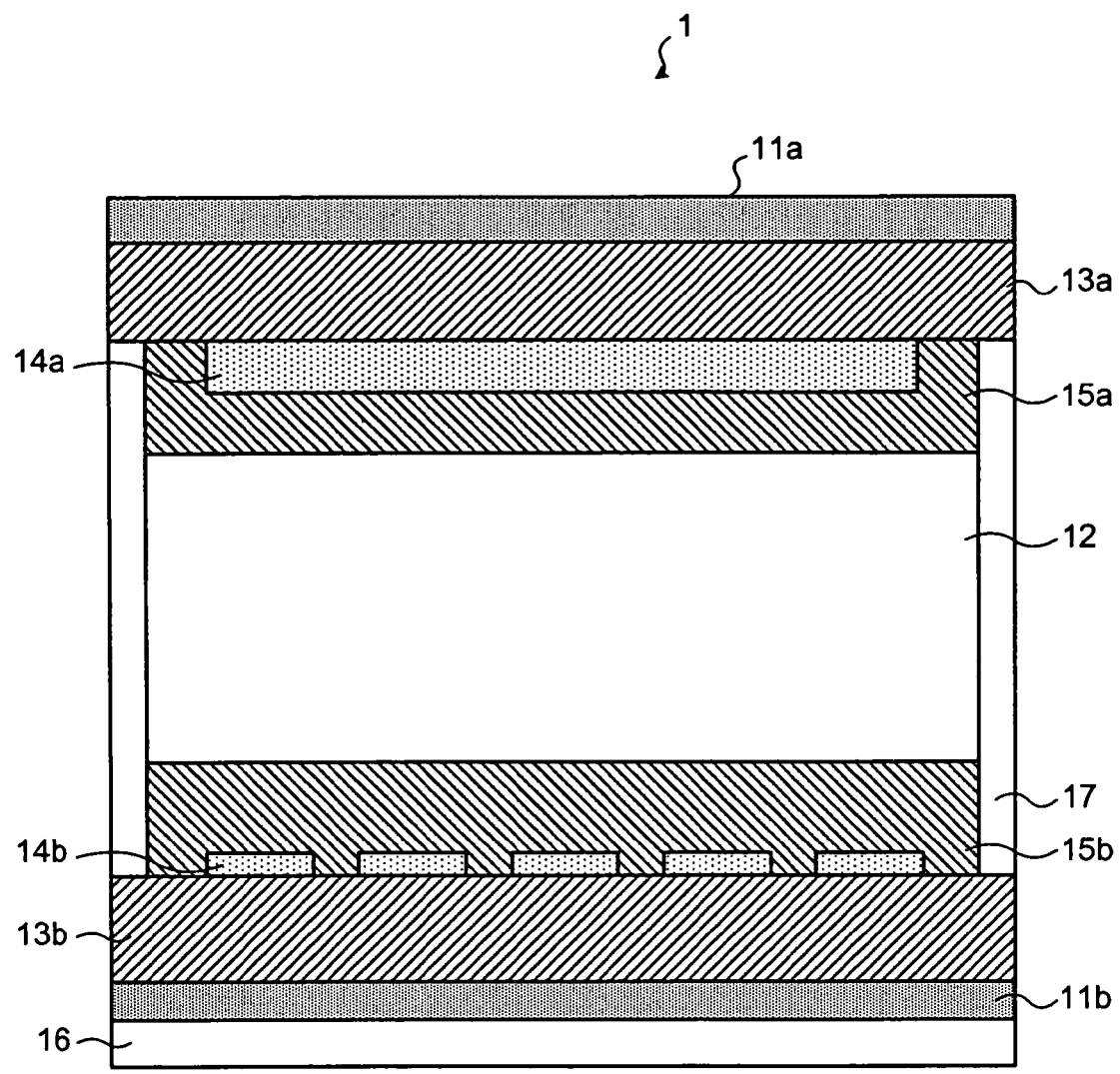
FIG. 2 is a cross-section for illustrating a structure of a liquid-crystal-display panel according to embodiments of the present invention.

FIG. 2 is a cross-section for illustrating a structure of a liquid-crystal-display panel according to embodiments of the present invention. As shown in FIG. 2, a liquid-crystal-display panel 1 includes a pair of glass substrates 13a, 13b sandwiching a liquid crystal layer 12 having a thickness of about 2 μm, and a sealing material 17 for bonding two pieces of the glass substrates 13a, 13b. On surfaces of the glass substrates 13a and 13b that oppose to each other, electrodes (ITO) 14a and 14b are respectively formed so that pixels are arranged in a dot matrix, and orientation films 15a and 15b are arranged thereon to perform orientation treatment.

Furthermore, on an outer surface of one of the glass substrates (hereinafter, "first glass substrate") 13a, a first polarizing film 11a is arranged. On an outer surface of the other of the glass substrates (hereinafter, "second glass substrate") 13b, a second polarizing film 11b is arranged so that a polarizing axis differs by 90 degrees from that of the first polarizing film 11a. On an outer surface of the second polarizing film 11b, a reflection film 16 is arranged. Instead of the second polarizing film 11b and the reflective film 16, a reflective polarizing film having a polarizing function may be arranged. Although not particularly limited, in the present embodiment, ferroelectric liquid crystal is used for the liquid crystal layer 12. Relationship between directions of a transmissive axis of the first polarizing film 11a and a long axis of a molecule of ferroelectric liquid crystal will be explained later. If a liquid crystal material other than ferroelectric liquid crystal is used for the liquid crystal layer 12, the second polarizing film 11b may be omitted. In such a case, the reflection film 16 may be arranged on an inner side of the second glass substrate 13b.

Figure 7:
FIG. 7 is a schematic of an image displayed on the liquid-crystal-display panel according to the embodiments of the present invention.

On a display surface of the liquid-crystal-display panel 1 structured as described above, a barcode conforming to various standards is displayed (see FIG. 7). To read the barcode displayed with a barcode reader, light from the barcode reader (not shown) is irradiated from a side of the first glass substrate 13a. The light irradiated transmits through the first polarizing film 11a, the first glass substrate 13a, the electrode 14a, the orientation film 15a, the liquid crystal layer 12, the orientation film 15b, the electrode 14b, the second glass substrate 13b, and the second polarizing film 11b to reach the reflection film 16 at which the light is reflected. The light reflected travels back reversely and exits from the first polarizing film 11a to be received by the barcode reader.

Figure 3:
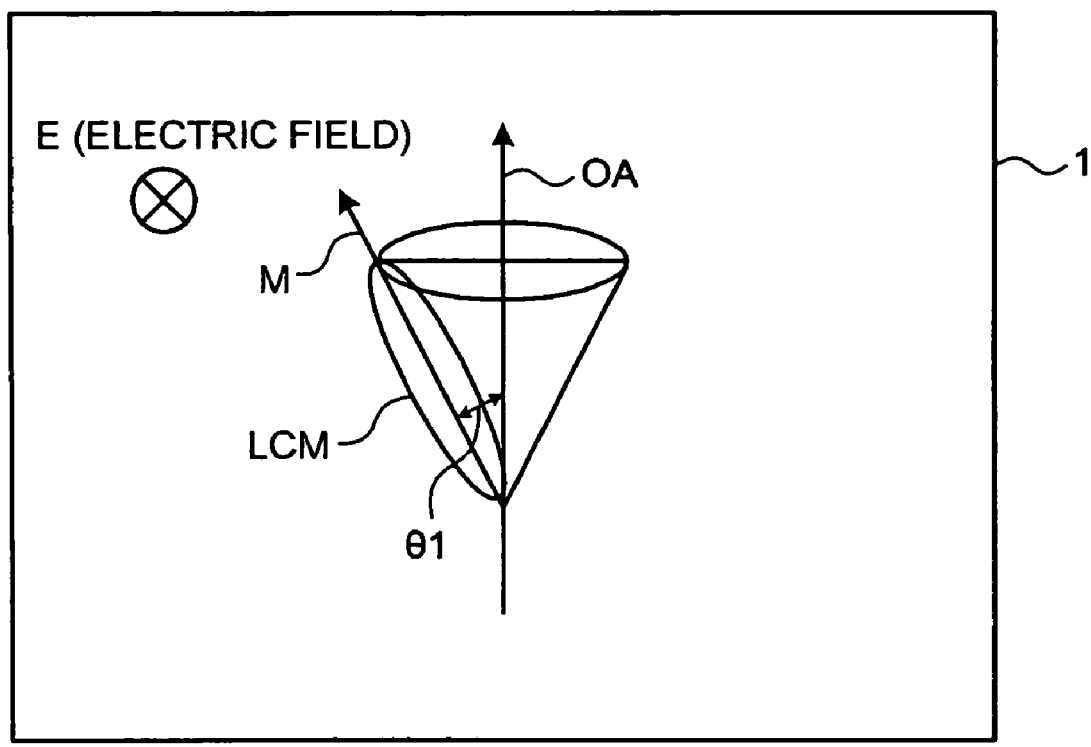
FIG. 3 is a schematic for explaining relationship between a direction of a molecular long axis of ferroelectric liquid crystal and an electric field.
Figure 4:
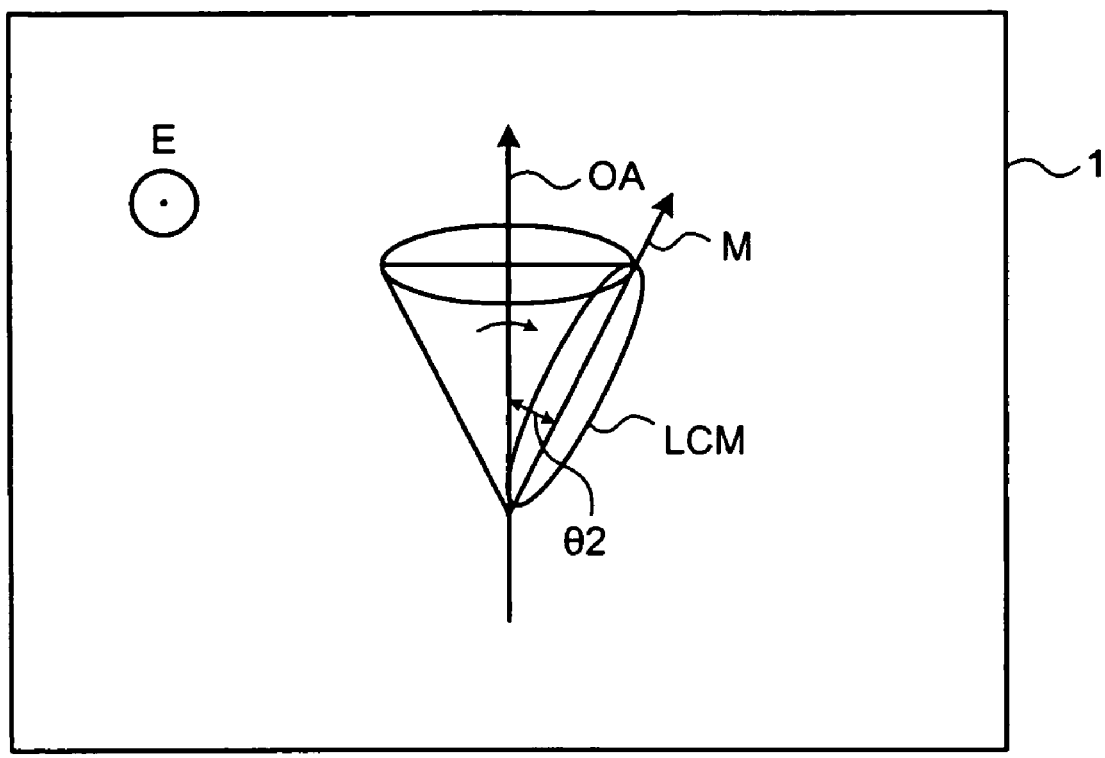
FIG. 4 is a schematic for explaining relationship between a direction of the molecular long axis of ferroelectric liquid crystal and an electric field.

Next, electro-optic effect of ferroelectric liquid crystal will be explained. FIGS. 3 and 4 are schematics for explaining relationship between a direction of a molecular long axis of ferroelectric liquid crystal and an electric field. In FIGS. 3 and 4, a liquid crystal molecule is schematically shown when the liquid-crystal-display panel 1 is seen from a side from which light is irradiated by the barcode reader at the time of reading a barcode. Referring to these drawings, an average direction of the molecular long axis of liquid crystal will be explained.

For example, when an electric field E is applied in a direction from a front side (the first glass substrate 13a of the liquid-crystal-display panel 1) of the drawing to a rear side (the second glass substrate 13b of the liquid-crystal-display panel 1) (FIG. 3), an average direction M of the molecular long axis in a first ferroelectric state of a liquid crystal molecule LCM is stable inclined at an angle "θ1" relative to an orientation axis OA of the orientation film. On the other hand, when an electric field E is applied in a direction from the rear side to the front side of the drawing (FIG. 4), an average direction M of the molecular long axis in a second ferroelectric state of the liquid crystal molecule LCM is stable inclined clockwise at an angle "θ2" relative to the orientation axis OA of the orientation film.

In other words, the liquid crystal molecule LCM transfers on a side surface of a conical shape drawn with the direction M of the molecular long axis as a moving line. A sum (θ1+θ2) of the angle "θ1" and the angle "θ2" is an angle between the average direction M of the molecular long axis of liquid crystal molecule in the first ferroelectric state and the average direction M of the molecular long axis of liquid crystal molecule in the second ferroelectric state, that is, an a central angle θ of a cone (that is, cone angle).

Figure 5:
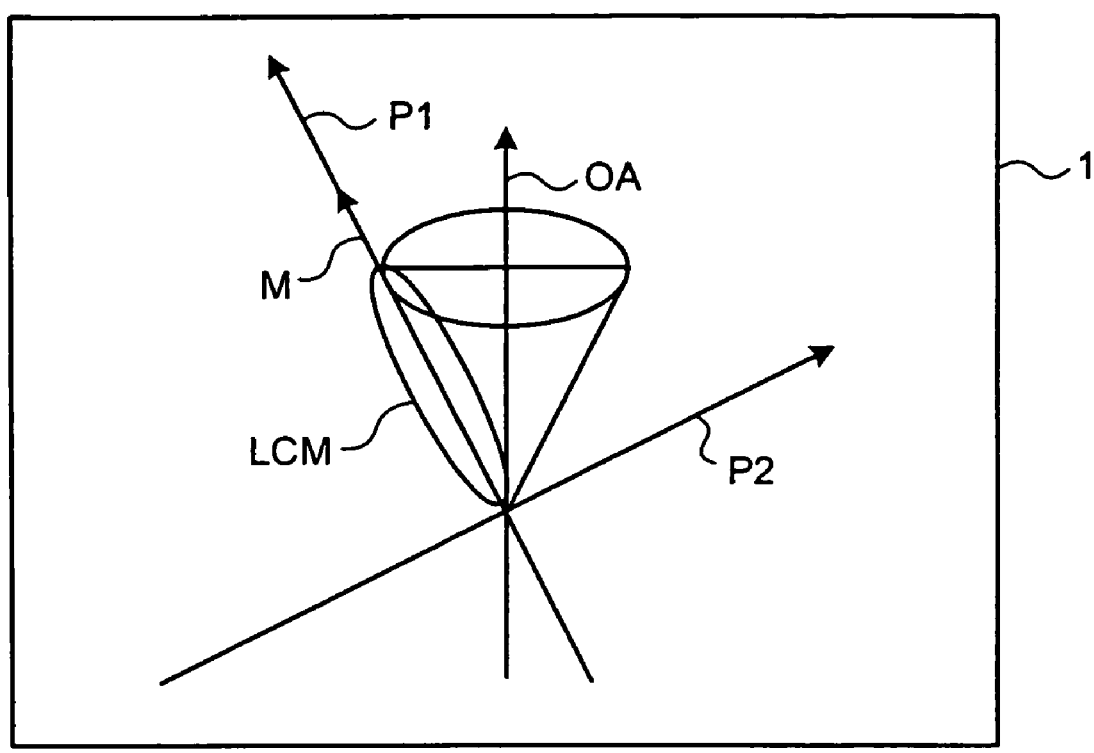
FIG. 5 is a schematic for explaining relationship between a direction of a molecular long axis of ferroelectric liquid crystal and transmissive axes of polarizing films.

FIG. 5 is a schematic for explaining relationship between a direction of a molecular long axis of ferroelectric liquid crystal and transmissive axes of polarizing films. As shown in FIG. 5, usually, when ferroelectric liquid crystal is used, a transmissive axis P1 of the first polarizing film 11a and a transmissive axis P2 of the second polarizing film 11b are arranged so as to form approximately 90 degrees therebetween. Furthermore, the transmissive axes P1 and P2 are set so that either one of the transmissive axis P1 of the first polarizing film 11a and the transmissive axis P2 of the second polarizing film 11b coincides with the direction M of the molecular long axis in either the first or the second ferroelectric state (in the example shown, the direction M of the molecular long axis is set to coincides with the direction of the transmissive axis P1). In the ferroelectric state in which the direction M is set to coincides with the direction of the transmissive axis, it is possible to decrease transmittance, and a black display is obtained. When orientation of the electric field E reverses, the liquid crystal molecule LCM moves with respect to the orientation axis OA as an axis of symmetry so that the transmittance increases, and a white display is obtained.

Next, relationship between the direction of transmissive axis of the first polarizing film 11a, the molecular long axis of ferroelectric liquid crystal, and an orientation of a barcode in the first embodiment will be explained. FIG. 1 illustrates the relationship. As shown in FIG. 1, in the first embodiment, the average direction M of the molecular long axis of liquid crystal in the second ferroelectric state coincides with the transmissive axis P1 of the first polarizing film 11a. Therefore, by applying a voltage to electrodes on portions for bars in a barcode to bring the liquid crystal molecule LCM in the second ferroelectric state, bars in the barcode are displayed in black.

On the other hand, by applying a voltage to electrodes on spaces between the bars in the barcode to bring the liquid crystal molecule LCM in the first ferroelectric state, the spaces between the bars in the barcode are displayed in white. When the cone angle is 45 degrees, better whiteness is realized in portions to be displayed in white. When the cone angle is less than 45 degrees or more than 45 degrees, whiteness of the white display portions is poorer than that realized when the cone angle is 45 degrees.

A barcode 2 is made up of black-displayed bars 21 each having a long narrow rectangular shape of various widths that are arranged in parallel while interposing white-displayed spaces 22 having various widths. In the first embodiment, the transmissive axis P1 of the first polarizing film 11a is parallel or substantially parallel to a short side of each of the bars 21. In other words, the direction of the transmissive axis P1 of the first polarizing film 11a, the average direction M of the molecular long axis of the liquid crystal molecule LCM in the second ferroelectric state, and the short side of the bars 21 of the barcode 2 are parallel or substantially parallel to each other.

In the liquid-crystal-display panel 1, since the barcode 2 is displayed such that a direction of the short side of the bars 21 becomes parallel to a predetermined side of the liquid-crystal-display panel 1 having, for example, a rectangular shape, an orientation direction (orientation axis OA) of the orientation films 15a, 15b is inclined from every side of the liquid-crystal-display panel 1. Inclination of the orientation direction is determined based on the cone angle at room temperature or at temperature of an environment in which the liquid-crystal-display panel 1 is used.

When the direction of the transmissive axis P1 of the first polarizing film 11a, the direction M of molecular long axis of ferroelectric liquid crystal, and the orientation of the barcode 2 have such relationship as described above, and when a barcode reader that reads a barcode by irradiating light polarized in the direction parallel or substantially parallel to the direction of the short side of the bars 21 in the barcode 2, the light transmits through the first polarizing film 11a and enters the liquid crystal layer 12, whereby the barcode 2 can be read stably and accurately. In addition, since the bars 21 in the barcode 2 are displayed with better blackness, the contrast in the barcode 2 increases. Accordingly, when a barcode reader that exhibits higher recognition rate as the contrast of barcode increases, it is possible to read the barcode more stably and accurately. If a barcode reader that reads a barcode by irradiating light polarized in a direction that is not parallel, for example, substantially perpendicular, to the direction of the short side of the bars 21 in the barcode 2, the light emitted from the barcode reader fails to transmit through the transmissive axis P1 of the first polarizing film 11a, as a result, the barcode 2 cannot be read.

Figure 6:
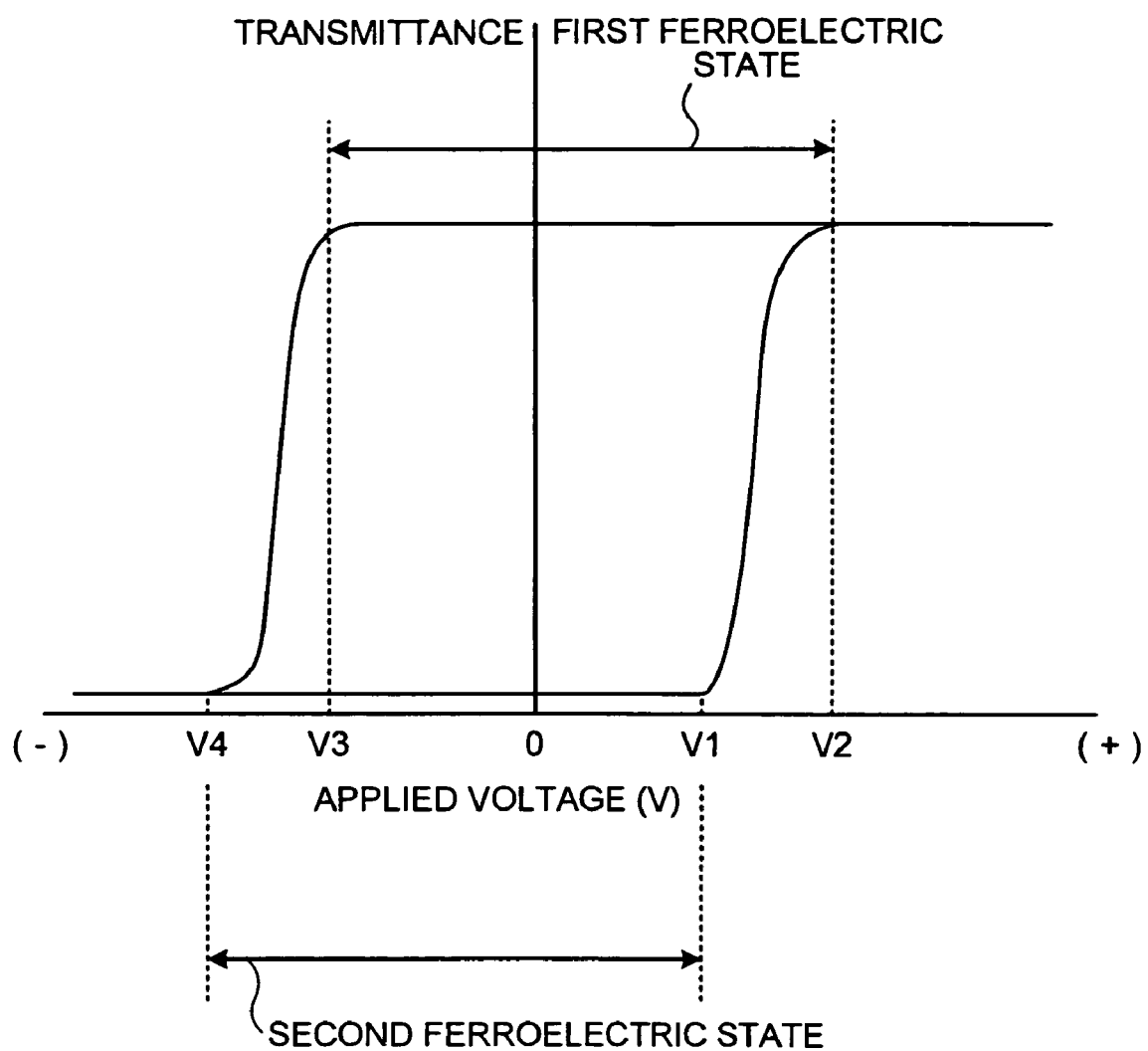
FIG. 6 is a characteristic plot for illustrating relationship between an applied voltage and transmittance in ferroelectric liquid crystal.

Next, a memory characteristic of ferroelectric liquid crystal will be explained. FIG. 6 is a characteristic plot for illustrating relationship between an applied voltage and transmittance in ferroelectric liquid crystal. In FIG. 6, a vertical axis represents the transmittance, and a horizontal axis represents the applied voltage. As shown in FIG. 6, when a positive voltage equal to a first threshold (+V1) or higher is applied to the ferroelectric liquid crystal, the transmittance starts increasing. Then, when a positive voltage equal to a predetermined value (+V2) or higher is applied, the first ferroelectric state is obtained in which light is transmitted at the maximum transmittance. To the contrary, when a negative voltage equal to a second threshold (−V3) or higher is applied on the ferroelectric liquid crystal, the transmittance starts decreasing. Then when a negative voltage equal to a predetermined value (−V4) or higher is applied, the second ferroelectric state is obtained in which the transmittance reaches the minimum.

In other words, as it is apparent from FIG. 6, ferroelectric liquid crystal has such a memory characteristic that transmittance is maintained even when the applied voltage is zero. Therefore, once a display state once written is maintained without a voltage supplied from outside until a voltage is applied to rewrite the display. Therefore, it is possible to keep displaying a barcode without continuously applying a voltage to the liquid crystal, thereby reducing power consumption.

FIG. 7 is a schematic of an image displayed when the liquid-crystal-display panel 1 is used as an electronic shelf label. Although not particularly limited, in the liquid-crystal-display panel 1, display is performed by a dot matrix display on a whole area of a display surface. On the display surface, a display item 3, such as characters and numerals indicating a name, value, and quantity (weight, etc.) of an article, the barcode 2, and a display item 4 of numerals and the like under the barcode 2 are displayed. When the liquid-crystal-display panel 1 is used as an electronic shelf label, although not particularly limited, for example, the liquid-crystal-display panel 1 has a size of about 5 cm in length and 10 cm in width, and includes pixels each having a size of about 50 μm×50 μm. Therefore, the liquid-crystal-display panel 1 enables display of 1000 dots×2000 dots (vertical×horizontal).

To the liquid-crystal-display panel 1, a liquid-crystal-driving circuit or the like, not shown, and a control circuit or the like for rewriting display contents are connected. When the liquid-crystal-display panel 1 is connected to a system for managing articles for sale by the POS system using the electronic shelf labels, a communication circuit or the like serving as a connecting unit with the system is connected to the liquid-crystal-display panel 1.

Second Embodiment

In a second embodiment, the relationship between the direction of transmissive axis of the first polarizing film 11a, the direction of molecular long axis of ferroelectric liquid crystal, and the orientation of the barcode is different from the relationship in the first embodiment. Other structures are the same as those of the first embodiment, and hence same explanation will be omitted.

Figure 8:
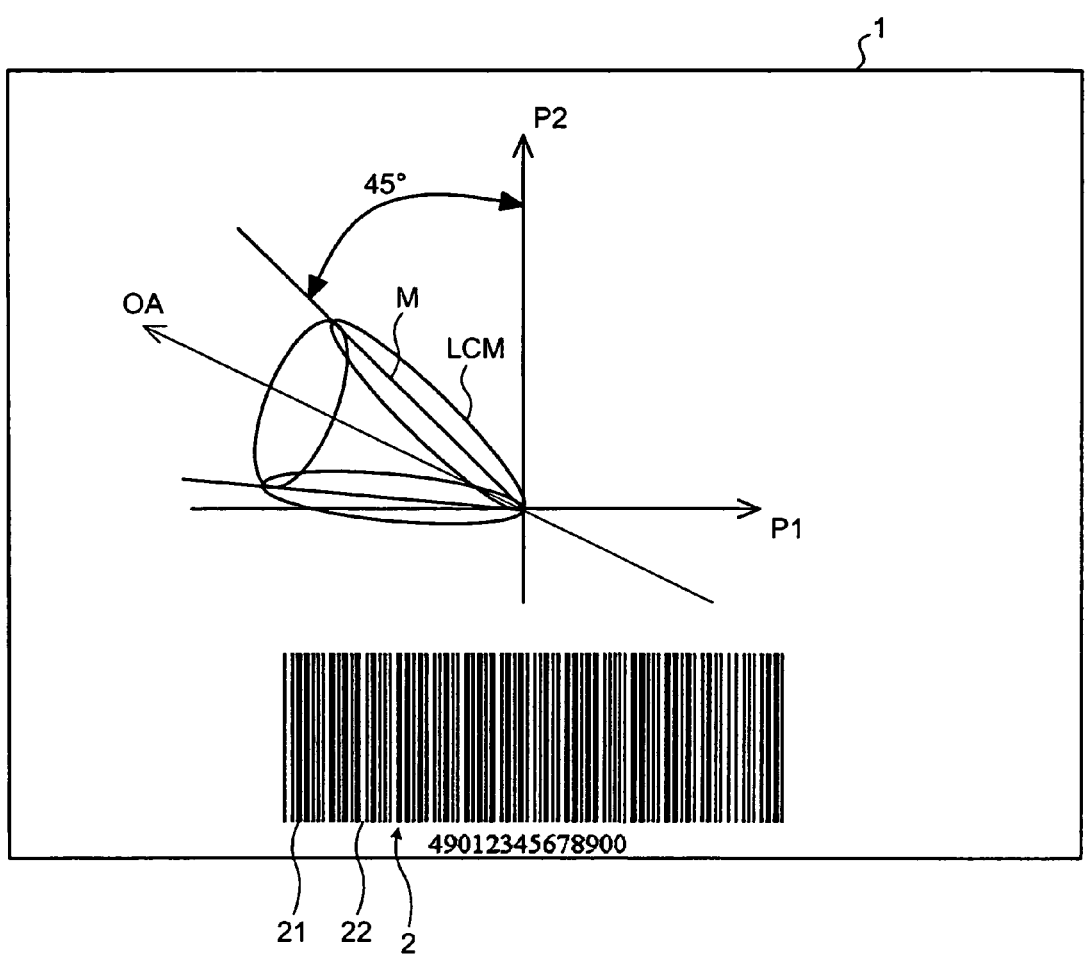
FIG. 8 is a schematic for explaining relationship between a direction of a molecular long axis of ferroelectric liquid crystal, a transmissive axis of a polarizing film, and orientation of a barcode on a liquid-crystal-display panel according to a second embodiment of the present invention.
Figure 9:
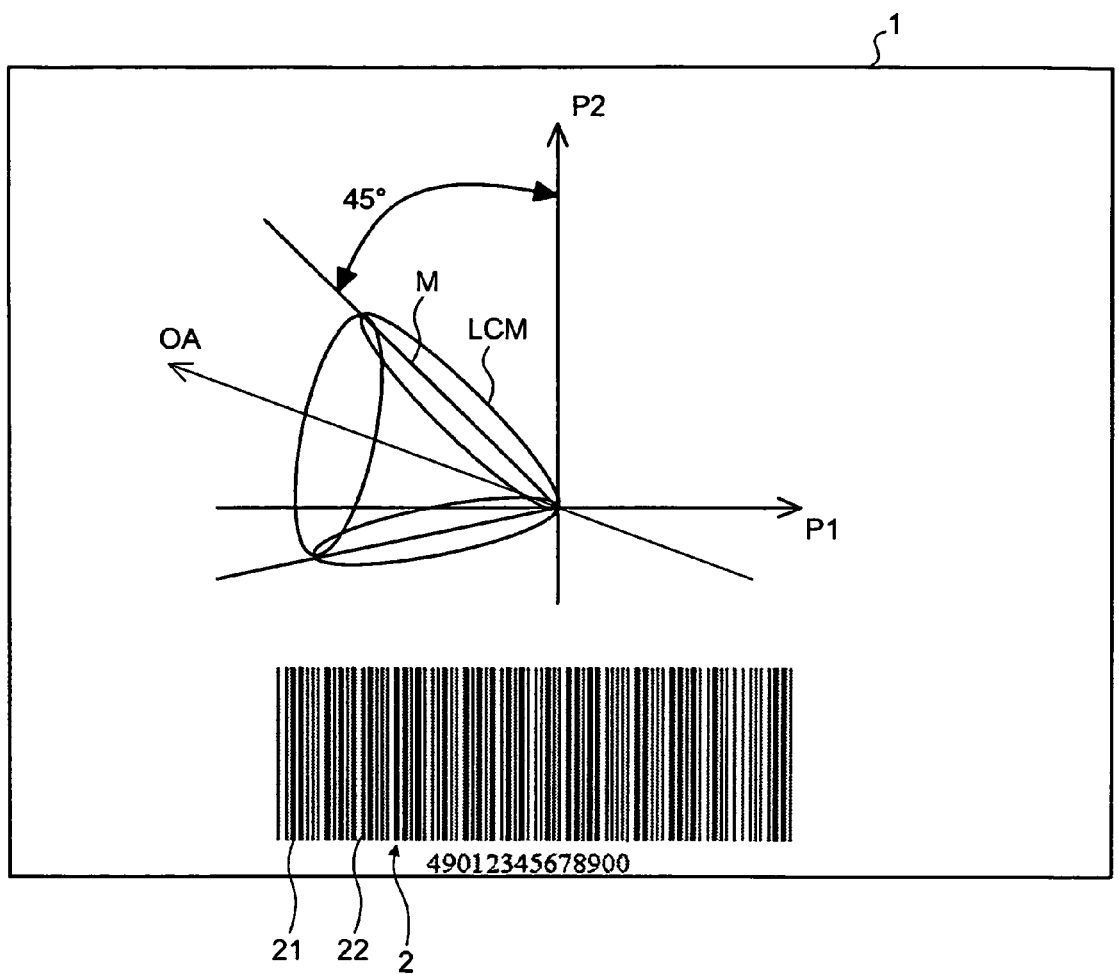
FIG. 9 is a schematic for explaining relationship between a direction of a molecular long axis of ferroelectric liquid crystal, a transmissive axis of a polarizing film, and orientation of a barcode on the liquid-crystal-display panel according to a second embodiment of the present invention.

FIG. 8 or FIG. 9 is schematic for explaining relationship between a direction of the transmissive axis of the first polarizing film 11a, a direction of the molecular long axis of ferroelectric liquid crystal, and orientation of a barcode on a liquid-crystal-display panel according to the second embodiment. As shown in FIG. 8 or FIG. 9, in the second embodiment, the average direction M of the molecular long axis of liquid crystal in the first ferroelectric state and the transmissive axis P1 of the first polarizing film 11a form an angle of 45 degrees or substantially 45 degrees. Since the angle formed by the transmissive axis P1 of the first polarizing film 11a and the transmissive axis P2 of the second polarizing film 11b is 90 degrees, an angle formed by the average direction M of the molecular long axis of the liquid crystal in the first ferroelectric state and the transmissive axis P2 of the second polarizing film 11b is 45 degrees or substantially 45 degrees.

Therefore, by applying a voltage to electrodes on portions between bars in the barcode to bring the liquid crystal molecule LCM into the first ferroelectric state, spaces between the bars are displayed in white. Additionally, the transmittance in the portions to be displayed in white reaches the maximum, thereby realizing better whiteness in the display.

In an example shown in FIG. 8, since the cone angle is smaller than 45 degrees, the average direction of the molecular long axis in the second ferroelectric state is deviated from the transmissive axis P1 of the first polarizing film 11a to the average direction M of the molecular long axis of liquid crystal in the first ferroelectric state. In an example shown in FIG. 9, the cone angle is larger than 45 degrees. In this example, the average direction M of the molecular long axis of liquid crystal in the second ferroelectric state is deviated in a direction opposite to the average direction M of the molecular long axis of liquid crystal in the first ferroelectric state while interposing the transmissive axis P1 of the first polarizing film 11a.

Therefore, in both examples shown in FIG. 8 and FIG. 9, by applying a voltage to the electrodes on portion for the bars in the barcode to bring the liquid crystal molecule LCM into the second ferroelectric state, the bars in the barcode are displayed in black. However, since the liquid crystal molecule LCM in the second ferroelectric state is positioned forming an angle with the transmissive axis P1 (in a direction of an absorbing axis of the second polarizing film 11b), a part of light fails to be absorbed by the second polarizing film 11b and hence is recognized as reflective light. Therefore, the blackness of a black display is inferior to that in the first embodiment.

The relationship between the direction of the transmissive axis of the first polarizing film 11a and the orientation of the barcode 2 is the same as that of the first embodiment. When the direction of the transmissive axis P1 of the first polarizing film 11a, the direction M of molecular long axis of ferroelectric liquid crystal, and the orientation of the barcode 2 have the relationship according to the second embodiment, and when the barcode reader that reads the barcode by irradiating light polarized in the direction parallel or substantially parallel to the short side of the bars 21 of the barcode 2, the light transmits through the first polarizing film 11*a* and enters the liquid crystal layer 12. Therefore, the barcode 2 can be read stably and accurately. In addition, because the spaces 22 of the barcode 2 is displayed with better whiteness, an amount of transmitting light increases. Accordingly, an amount of light reflected by the reflective film 16 increases. Therefore, when the barcode reader that exhibits higher recognition rate as the contrast of a barcode increases is used, it is possible to read a barcode more stably and accurately.

Third Embodiment

Figure 10:
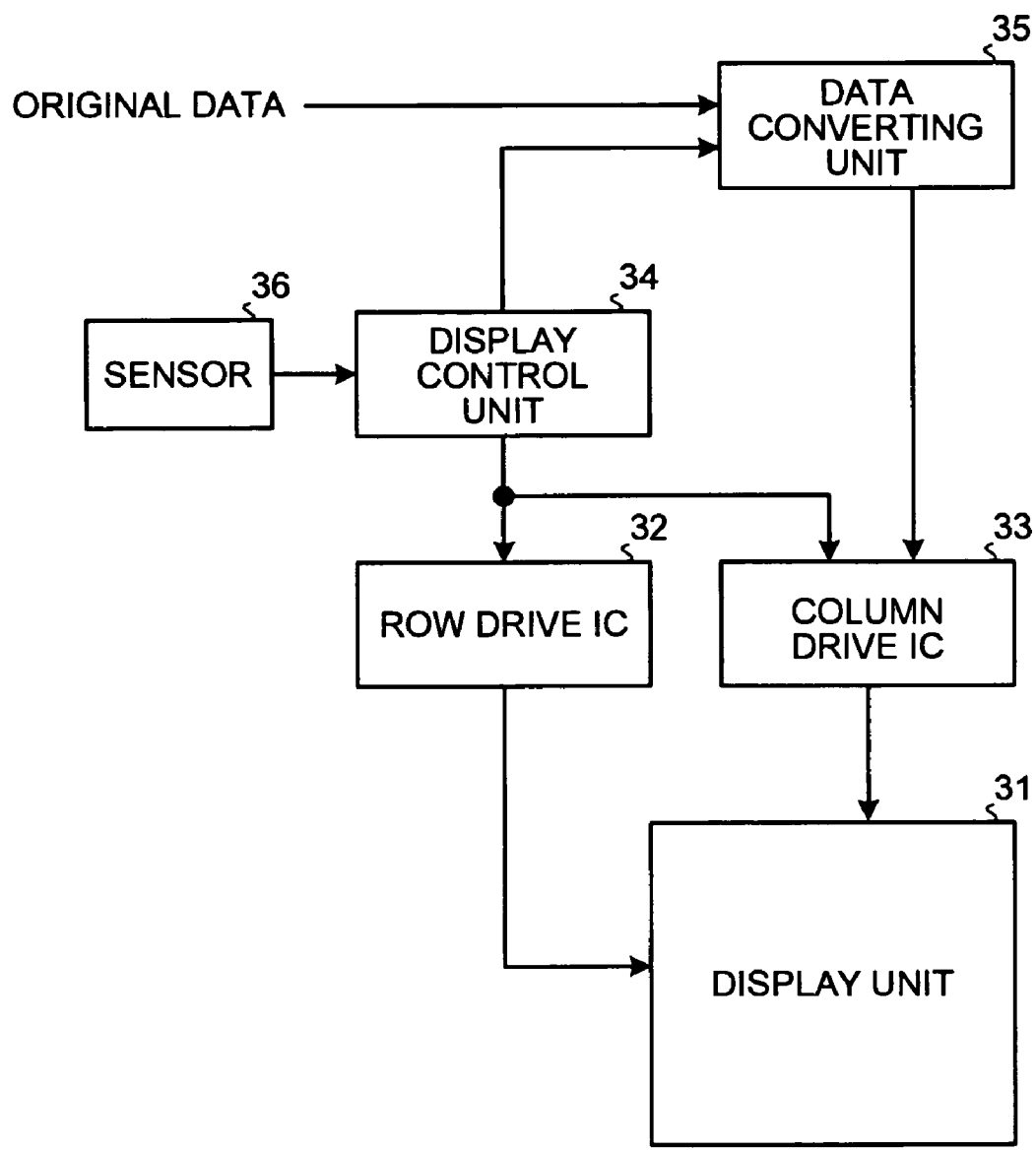
FIG. 10 is a block diagram of a driving circuit unit of a liquid-crystal-display panel according to a third embodiment of the present invention.

FIG. 10 is a block diagram of a structure including a driving circuit unit of a liquid-crystal-display panel 1 according to a third embodiment. As shown in FIG. 10, the liquid-crystal-display panel 1 includes a display unit 31 that displays the barcode 2, the display item 3 of characters or numerals, and the display item 4 of numerals indicated under the barcode 2; a row drive integrated circuit (IC) 32 that sequentially selects a scanning electrode of the display unit 31; a column drive IC 33 that applies a voltage corresponding to display data to a signal electrode of the display unit 31; and a display control unit 34 that controls the row drive IC 32 and the column drive IC 33.

The liquid-crystal-display panel 1 also includes a data converting unit 35 and a sensor 36. The data converting unit 35 converts original display data into data with which a display on the display unit 31 is rotated by 90 degrees from a display realized by the original display data. The sensor 36 detects failure in reading the barcode displayed on the display unit 31. The sensor 36 is, for example, a radio receiver.

Although not particularly depicted, for example, the barcode reader is provided with a radio transmitter that transmits, when the barcode displayed on the display unit 31 fails to be read, a signal (hereinafter, "read-impossible signal") for informing the liquid-crystal-display panel 1 that the barcode cannot be read. The sensor 36 of the liquid-crystal-display panel 1 receives the read-impossible signal transmitted from the radio transmitter of the barcode reader.

Figure 11:
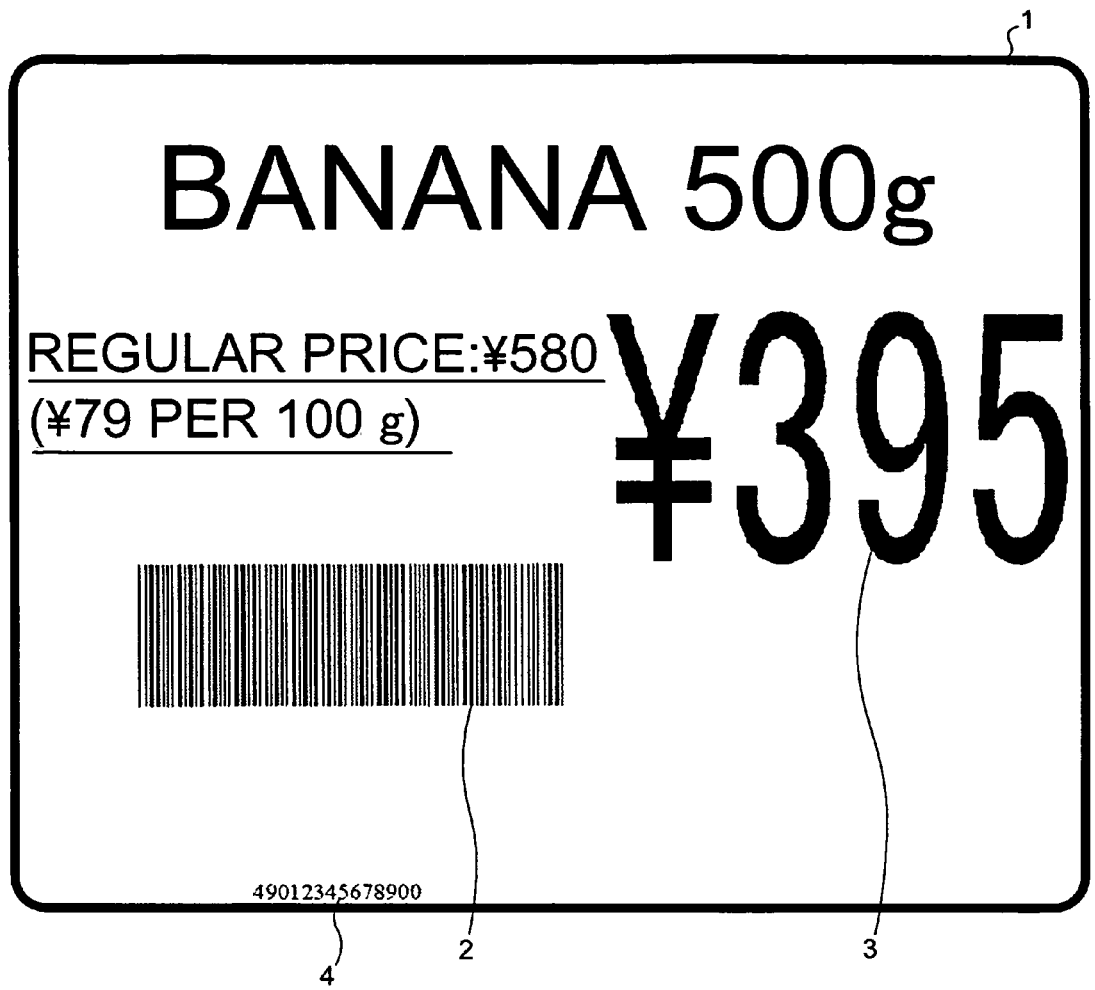
FIG. 11 is a schematic of a first image displayed on the liquid-crystal-display panel according to the third embodiment of the present invention.
Figure 12:
FIG. 12 is a schematic of a second image displayed on the liquid-crystal-display panel according to the third embodiment of the present invention.

FIG. 11 and FIG. 12 respectively illustrate a first image and a second image displayed on the liquid-crystal-display panel 1 according to the third embodiment. FIG. 11 is an example in which the original display data is displayed on the display unit 31 of the liquid-crystal-display panel 1 without being converted by the data converting unit 35. When the original display data is displayed as it is, the barcode 2 is displayed so that long sides of the bars 21 are parallel to a vertical direction of the liquid-crystal-display panel 1. In other words, a normal display as the image shown in FIG. 7 is obtained. In this case, the data converting unit 35 outputs the original display data as it is.

When the barcode 2 displayed in the above manner shown of FIG. 11 fails to be read, the barcode reader transmits a read-impossible signal. Upon receiving the read-impossible signal, the sensor 36 of the liquid-crystal-display panel 1 outputs a detection signal. Upon receiving the detection signal from the sensor 36, the display control unit 34 outputs a conversion starting signal and a drive starting signal. Upon receiving the conversion starting signal from the display control unit 34, the data converting unit 35 converts a part of the original display data that corresponds to the barcode so that orientation of the display of the barcode 2 is rotated by 90 degrees.

The data converted by the data converting unit 35 is outputs to the column drive IC 33 as new display data. The display control unit 34 outputs to the row drive IC 32 and the column drive IC 33 a signal to start driving the row drive IC 32 and the column drive IC 33. As a result, as shown in FIG. 12, a display of the display unit 31 is renewed to such a display that the long sides of the bars 21 of the barcode 2 are parallel to a horizontal direction of the liquid-crystal-display panel 1. Therefore, the barcode 2 is to be read by the barcode reader inclined by 90 degrees.

Figure 13:
FIG. 13 is a schematic of a third image displayed on the liquid-crystal-display panel according to the third embodiment of the present invention.
Figure 14:
FIG. 14 is a schematic of a fourth image displayed on the liquid-crystal-display panel according to the third embodiment of the present invention.

As another example of the third embodiment, the data converting unit 35 may convert the original display data into such data by which the orientation of the display itself is rotated by 90 degrees. FIG. 13 is a schematic of an example in which the original display data is displayed as it is on the original state. FIG. 14 is a schematic of an example in which the original display data is displayed so that a whole display is rotated by 90 degrees. In this case, the liquid-crystal-display panel 1 is to be attached to a shelf, on which articles for sale are displayed, so that a right side of the liquid-crystal-display panel 1 in the example shown in FIG. 14 is positioned at a bottom by rotating the liquid-crystal-display panel 1 by 90 degrees.

Instead of a configuration in which the barcode reader transmits the read-impossible signal by radio communication and the sensor 36 receives the read-impossible signal and outputs the detection signal, such a configuration may be provided in which a switch or the like is arranged on the liquid-crystal-display panel 1, and when a user of the barcode reader determines that the barcode displayed on the display unit 31 cannot be read, the user turns on the switch or the like to output the detection signal to make the display be rotated by 90 degrees. Such configuration is useful when the liquid-crystal-display panel 1 is used in combination with a barcode reader without a radio transmitter as is an existing barcode reader.

According to the third embodiment, since a polarizing direction of the light emitted from the barcode reader crosses at right angles with the direction of the transmissive axis of the polarizing film of the liquid-crystal-display panel 1, when the barcode cannot be read as it is, the barcode 2 rotated by 90 degrees is displayed on the display unit 31. Accordingly, by rotating the barcode reader by 90 degrees relative to the display unit 31, it is possible to make the polarizing direction of the light for reading a barcode coincides with the direction of the transmissive axis of the polarizing film. Accordingly, the light for reading a barcode transmits through the polarizing film and enters the liquid crystal, thereby enabling to read the barcode 2 stably and accurately.

The present invention is not limited to the embodiments described above, and may be modified in various ways. For example, when a barcode reader that reads a barcode by irradiating light polarized in a direction parallel or substantially parallel to the long side of the bars 21 of the barcode 2 is used, the transmissive axis P1 of the first polarizing film 11*a* may be made parallel or substantially parallel to the long side of the bars 21.

Moreover, instead of displaying the barcode 2 in the dot matrix, the barcode 2 may be displayed by segments. In this case, in an area for displaying the barcode 2 on the display surface of the liquid-crystal-display panel 1, strip segments with which a bar and a space having the shortest widths among the bars 21 and the spaces 22 in the barcode 2 respectively can be displayed are arranged without creating any space. Then, appropriate number of neighboring segments may be displayed in black or white according to a width of the bar 21 and the space 22 to be displayed.

While in the embodiments described above, the liquid-crystal-display panel 1 is a reflective panel, the liquid-crystal-display panel 1 may be a transmissive panel or a transflective panel. In a case of a transmissive panel, the reflection film 16 is no longer required. In a case of a transflective panel, a reflection film that is partially light transmissive is used as the reflection film 16. Furthermore, the present invention may be applied not only to a barcode, but also to a case in which characters, numerals, symbols, and patterns that are to be read by irradiating light polarized in a predetermined direction are displayed on the liquid-crystal-display panel 1.

INDUSTRIAL APPLICABILITY

As described above, a liquid-crystal-display panel and a barcode reading system according to the present invention are useful for an electronic display medium on which a barcode is displayed and a barcode reading system using the same, and more particularly for electronic shelf labels used in a supermarket or the like, tags attached to packages collected in a forwarding industry, tags used for destination management of air freight, and individual identification in a traceability system for retaining information such as a producer and distribution history of products or foods.

The invention claimed is:

1. A liquid-crystal-display panel for displaying a barcode that is formed with bars having various widths arranged in parallel at various intervals by an electro-optic effect of liquid crystal, the liquid-crystal-display panel comprising:
    a pair of substrates, each with a pair of surfaces opposing to each other and being covered with an orientation film;
    a liquid crystal layer sealed between the substrates; and
    a polarizing film attached on one of the substrates, the one on a side on which light for reading the barcode is irradiated, wherein
    the liquid crystal layer is formed with ferroelectric liquid crystal having a first ferroelectric state and a second ferroelectric state as stable states,
    the barcode is displayed such that a direction of a short side of the barcode becomes parallel to a predetermined side of the liquid-crystal-display panel, and an orientation direction (orientation axis OA) of the orientation films, which determines a direction of a molecular of the ferroelectric liquid crystal, is always inclined from every side of the liquid-crystal-display panel, the direction of the short side of the barcode and a direction of a long side of the barcode, and
    a direction of a transmissive axis of the polarizing film coincides with a direction in which the light for reading a barcode is polarized.

2. The liquid-crystal-display panel according to claim 1, wherein the direction of the transmissive axis of the polarizing film is parallel or substantially parallel to a short or long side of each of the bars forming the barcode.

3. The liquid-crystal-display panel according to claim 1, wherein
    a direction of a long axis of a molecule of ferroelectric liquid crystal in any one of the first ferroelectric state and the second ferroelectric state is parallel or substantially parallel to the direction of the transmissive axis of the polarizing film.

4. The liquid-crystal-display panel according to claim 1, wherein
    an angle between a direction of a long axis of a molecule of ferroelectric liquid crystal in any one of the first ferroelectric state and the second ferroelectric and the direction of the transmissive axis of the polarizing film is 45 degrees or substantially 45 degrees.

5. The liquid-crystal-display panel according to claim 1, further comprising a data converting unit that converts original data for displaying a barcode on a display unit into data for displaying the barcode rotated by 90 degrees, wherein
    the barcode that is rotated by 90 degrees is displayed on the display unit based on new data obtained by conversion by the data converting unit.

6. A barcode reading system comprising:
    a liquid-crystal-display panel for displaying a barcode that is formed with bars having various widths arranged in parallel at various intervals by an electro-optic effect of liquid crystal, the liquid-crystal-display panel including
    a pair of substrates, each with a pair of surfaces opposing to each other and being covered with an orientation film;
    a liquid crystal layer sealed between the substrates; and
    a polarizing film attached on one of the substrates, the one on a side on which light for reading the barcode is irradiated;
    a barcode reader that emits light for reading the barcode to the liquid-crystal-display panel, wherein
    the liquid crystal layer is formed with ferroelectric liquid crystal having a first ferroelectric state and a second ferroelectric state as stable states,
    the barcode is displayed such that a direction of a short side of the barcode becomes parallel to a predetermined side of the liquid-crystal-display panel, and an orientation direction of the orientation films, which determines a direction of a molecular of the ferroelectric liquid crystal, is always inclined from every side of the liquid-crystal-display panel, the direction of the short side of the barcode and a direction of a long side of the barcode, and
    a direction in which the light is polarized, the light irradiated to the liquid-crystal-display panel by the barcode reader, coincides with a direction of a transmissive axis of the polarizing film.

* * * * *